US007979159B2

(12) United States Patent
Fixell

(10) Patent No.: US 7,979,159 B2
(45) Date of Patent: Jul. 12, 2011

(54) METHOD AND SYSTEM FOR DETERMINING THE RELATION BETWEEN A ROBOT COORDINATE SYSTEM AND A LOCAL COORDINATE SYSTEM LOCATED IN THE WORKING RANGE OF THE ROBOT

(75) Inventor: Peter Fixell, Västerås (SE)

(73) Assignee: ABB Technology AB, Vasteras (SE)

( * ) Notice: Subject to any disclaimer, the term of this patent is extended or adjusted under 35 U.S.C. 154(b) by 0 days.

(21) Appl. No.: 12/936,520

(22) PCT Filed: Apr. 30, 2008

(86) PCT No.: PCT/EP2008/055304
§ 371 (c)(1),
(2), (4) Date: Oct. 6, 2010

(87) PCT Pub. No.: WO2009/132703
PCT Pub. Date: Nov. 5, 2009

(65) Prior Publication Data
US 2011/0046782 A1  Feb. 24, 2011

(51) Int. Cl.
*G05B 19/401* (2006.01)
*B25J 9/02* (2006.01)
(52) U.S. Cl. .............. 700/251; 901/15; 901/9; 700/254
(58) Field of Classification Search .............. 700/251, 700/254; 318/568.19; 73/1.75; 901/15, 901/16, 32, 33
See application file for complete search history.

(56) References Cited

U.S. PATENT DOCUMENTS

| 5,177,563 | A | * | 1/1993 | Everett et al. ............. 356/621 |
| 5,528,116 | A | * | 6/1996 | Snell ..................... 318/568.13 |
| 5,687,293 | A | * | 11/1997 | Snell ......................... 700/254 |
| 5,893,214 | A | * | 4/1999 | Meier et al. .................. 33/293 |
| 6,044,308 | A | * | 3/2000 | Huissoon ................... 700/166 |

(Continued)

FOREIGN PATENT DOCUMENTS
WO    WO 03037575 A    5/2003
(Continued)

OTHER PUBLICATIONS
The Written Opinion of the International Searching Authority.

*Primary Examiner* — Khoi Tran
*Assistant Examiner* — Jason Holloway
(74) *Attorney, Agent, or Firm* — Seppo Laine Oy

(57) ABSTRACT

The present invention relates to a method and a system for determining the relation between a local coordinate system located in the working range of an industrial robot (1) and a robot coordinate system. The method includes attaching a first calibration object (10) in a fixed relation to the robot and determining the position of the first calibration object in relation to the robot. Then, locating at least three second calibration objects (14,15,16) in the working range of the robot, a reference position for each of the second calibration objects in the local coordinate system can be determined by moving the robot until the first calibration object is in mechanical contact with each second calibration object. By reading the position of the robot when the calibration objects are in mechanical contact the relation between the local coordinate system and the robot coordinate system can be calculated.

14 Claims, 3 Drawing Sheets

U.S. PATENT DOCUMENTS

| | | | |
|---|---|---|---|
| 6,070,109 A * | 5/2000 | McGee et al. | 700/259 |
| 6,418,774 B1 * | 7/2002 | Brogårdh et al. | 73/1.75 |
| 6,812,665 B2 * | 11/2004 | Gan et al. | 318/568.11 |
| 6,822,412 B1 * | 11/2004 | Gan et al. | 318/568.19 |
| 6,836,702 B1 * | 12/2004 | Brogårdh et al. | 700/245 |
| 6,941,192 B2 * | 9/2005 | Tang et al. | 700/254 |
| 2003/0200042 A1 * | 10/2003 | Gan et al. | 702/105 |
| 2004/0251866 A1 * | 12/2004 | Gan et al. | 318/568.11 |
| 2004/0254677 A1 * | 12/2004 | Brogardh et al. | 700/245 |
| 2008/0114494 A1 * | 5/2008 | Nixon | 700/254 |

FOREIGN PATENT DOCUMENTS

| | | |
|---|---|---|
| WO | WO 2004108364 A | 12/2004 |
| WO | WO 2009132703 | 11/2009 |

* cited by examiner

METHOD AND SYSTEM FOR DETERMINING THE RELATION BETWEEN A ROBOT COORDINATE SYSTEM AND A LOCAL COORDINATE SYSTEM LOCATED IN THE WORKING RANGE OF THE ROBOT

FIELD OF THE INVENTION

The present invention relates to a method and a device for determining the relation between a local coordinate system located in the working range of an industrial robot and a robot coordinate system. The invention is, for example, suitable for determining the relation between a work piece coordinate system, or a fixture coordinate system, and a robot coordinate system.

PRIOR ART

A basic problem in robot installations and commissioning of robot cells is the identification of the relation of the robot to a work piece to be processed by the robot. The robot is supposed to perform work on the work piece and the work piece is located in the working range of the robot. The same problem arises in cases when the robot holds the work piece to be processed and a tool is located in the working range of the robot. In that case the relation between the tool and the robot must be identified.

The reason for the work piece identification is to define a local coordinate system in the work piece that can be used for programming the robot to perform work on the work piece. There are two major advantages with this approach: the programming will be done in the coordinates of the work piece, which will give better understanding by the programmer. An alternative would be to program the robot in the robot base coordinate system. However, this will be less easy to understand for the programmer. If the programming is done in the work piece coordinate system the programming will be easy to reuse if the relation between the robot and the work piece is changed for some reason, such as moving the installation. The reuse will simply just include a new identification of the relation between the robot coordinate system and the work piece coordinate system. Further, use of offline generated programs will be supported in an easy and accurate way.

OBJECTS AND SUMMARY OF THE INVENTION

The object of the present invention is to provide a method for determining the relation between a local coordinate system located in the working range of the robot and the robot coordinate system, which method is simple, quick and accurate.

This object is achieved by a method as defined in claim 1.

Such a method comprises: Attaching a first calibration object in a fixed relation to the robot, determining the position of the first calibration object in relation to the robot, locating at least three second calibration objects in the working range of the robot, wherein at least one of calibration objects is a male calibration object having a protruding part shaped as a sphere, and at least one of the calibration objects is a female calibration object comprising at least two nonparallel, inclining surfaces arranged to receive the sphere so that the sphere is in contact with the surfaces in at least one reference position, determining at least one reference position for each of the second calibration objects in the local coordinate system, A) moving the robot in a compliant way until the sphere is in mechanical contact with the surfaces of the female calibration object, B) reading the position of the robot in the robot coordinate system when the sphere is in mechanical contact with the surfaces, repeating the steps A-B for the other two calibration objects, and calculating the relation between the local coordinate system and the robot coordinate system based on the position of the first calibration object in relation to the robot, the reference positions of the second calibration objects in the local coordinate system, and the positions of the robot when the sphere is in mechanical contact with the surfaces of the second calibration objects.

The invention supports an automatic, quick, easy, and accurate identification of positions to be used for calculating the local coordinate system. The method is suitable for being carried out automatically by the robot itself. The robot can be programmed to move the first calibration object to the second calibration object, and further until the sphere is in mechanical contact with the surfaces, and accordingly the sphere is positioned in the reference position.

The robot is provided with a self searching capability, for example, using force control or soft servo, which moves the robot in a compliant way until the sphere is in mechanical contact with the surfaces of the female calibration object. When having an automatic identifying function, which is easy and quick to use, there is a possibility to repeatedly identify the relation between the work piece and the robot looking for long time changes as well as deviations due to temperature changes. This method according to the invention is useful for initial identification of the relation as well as keeping track on and compensate for long-term changes and temperature drift.

According to the invention, at least one of the calibration objects is a male calibration object having a protruding part shaped as a sphere and at least one of the calibration objects is a female calibration object comprising at least two nonparallel, inclining surfaces arranged to receive the sphere so that the sphere is in contact with the surfaces in at least one reference position. When the male and female calibration objects are combined they will give an accurate and repeatable position of the sphere in relation to the surfaces in at least two degrees of freedom. The reference position of the calibration object is defined as the position of the sphere when it is in contact with the surfaces of the female calibration object. In case the female calibration object has only two surfaces, there exists a plurality of reference positions positioned along a straight line. In this case at least two reference positions should be measured in order to determine the line. In case the calibration object has three nonparallel, inclining surfaces there exists only one reference position and the position of the sphere can be determined in relation to the surfaces of the female calibration object in three degrees of freedom. In this case it is enough to measure the one and only reference position.

As the surfaces are inclined, the number of possible positions in which the sphere is in contact with the surfaces is reduced. Advantageously, the inclination of the surfaces is in the interval of 20-80°, and preferably in the interval of 30-60°. If the inclination is too steep, the measuring becomes uncertain and if the inclination is too flat it is difficult to find the position in which the sphere is in contact with the surfaces.

By determining the reference positions in the local coordinate system as well as in the robot coordinate system it is easy to determine the relation between the robot coordinate system and the local coordinate system.

The first calibration object is, for example attached to the robot, or to a tool carried by the robot.

According to an embodiment of the invention, at least one of the calibration objects comprises three nonparallel, inclining surfaces arranged to receive the sphere so that the sphere is in contact with all three surfaces at the reference position. When the sphere is combined with the three inclining surfaces, there is only one position in which the sphere is in contact with all three surfaces and a single, accurate position of the sphere in relation to the surfaces is defined. The sphere is allowed to rotate freely in all dimensions and the only thing that effects the accuracy of the position information is the accuracy of the sphere. This embodiment provides an accurate and repeatable position of the male calibration object in relation to the female calibration object.

According to an embodiment of the invention, the sphere is attached to the robot, the other calibration objects are shaped as grooves with two inclining surfaces, and at least three grooves are located in the robot work area such that their longitudinal directions are non parallel, and the method comprises moving the robot in a compliant way until the sphere has been in mechanical contact with both surfaces on all three grooves and the positions of the robot has been stored for all three grooves, and calculating the relation between the local coordinate system and the robot coordinate system based on the positions of the robot when the sphere is in mechanical contact with the surfaces of the grooves.

According to an embodiment of the invention, the robot is automatically moved by means of force control. The force control makes it possible for the robot to automatically locate the position in which the sphere is in contact with the surfaces and accordingly to automatically find the reference point. With force control is meant that the force or torque between the first calibration object and the robot is measured in at least two directions and the movement of the robot is made in dependence on the measured force or torque. The force or torque is measured in at least three degrees of freedom in case the calibration object is provided with three inclining surfaces. The sphere is in the reference position when there is a force or a torque in three directions. Force control is an active and sensitive control.

According to an embodiment of the invention, the robot is automatically moved by means of a soft servo. A soft servo is robot control without a position loop. The soft servo makes it possible for the robot to automatically locate the position in which the sphere is in contact with the surfaces and accordingly to automatically find the reference point.

Another object of the present invention is to provide a system for determining the relation between a local coordinate system located in the working range of the robot and the robot coordinate system.

This object is also achieved by a system as defined in claim 7.

Such a system comprises: a first calibration object adapted to be attached in a fixed relation to the robot, three second calibration objects to be positioned in the working range of the robot, wherein at least one of calibration objects is a male calibration object having a protruding part shaped as a sphere, and at least one of the calibration objects is a female calibration object comprising at least two nonparallel, inclining surfaces arranged to receive the sphere so that the sphere is in contact with the surfaces in at least one reference position, and means for automatically moving the robot in a compliant way until the sphere is in mechanical contact with the surfaces of the calibration object, and a computing unit configured to receive and store the position of the robot when the sphere is in mechanical contact with the surfaces, and to calculate the relation between the local coordinate system and the robot coordinate system based on a known relation between the first calibration object and the robot, the reference positions in the local coordinate system, and the position of the robot when the sphere is in mechanical contact with the surfaces.

The calibration object is easy to use and easy to attach to the robot tool, to a fixture, or to a work object.

For example, the calibration object is shaped as a truncated inner corner of a cube. This shape is easy to manufacture as mechanical tolerances are non-critical. Independent of the manufacturing, there will only be one reference position.

The method and the system according to the invention is, for example, suitable for determining the relation between a coordinate system of a fixture for holding a work piece to be processed by the robot and the robot coordinate system.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
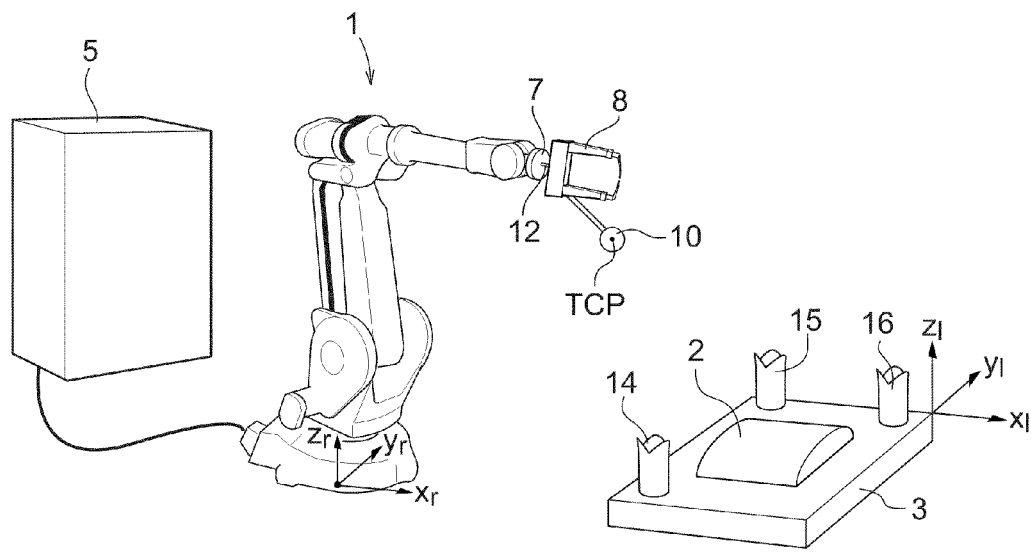
FIG. 1 shows a system for determining the relation between a local coordinate system and a robot coordinate system according to an embodiment of the invention.

FIG. 1 shows a system for determining the relation between a local coordinate system $x_l$, $y_l$, $z_l$, and a robot coordinate system $x_r$, $y_r$, $z_r$ according to an embodiment of the invention. In this example, the robot coordinate system is located in the base of the robot and is denoted the base coordinate system of the robot. In this example, the local coordinate system is a work piece coordinate system and is related to a work piece 2 to be processed by the robot and which is fixedly hold by a fixture 3.

The robot 1 is provided with a robot controller 5 including at least one processor, memory and communication means. In this example, the robot controller 5 is utilized for carrying out most of the steps in the method according to the invention. The robot 1 comprises a tool flange 7 for attaching a tool 8. A first calibration object 10 in the form of a male calibration object including a sphere 10 is fixedly attached to the tool 8, and accordingly fixedly attached to the robot, during the calibration. The sphere 10 is attached to the robot tool 8 using a shaft or other structure. In an alternative embodiment, the first calibration object 10 can be attached to the tool flange 7. The tool centre point (TCP) of the sphere 10 must be known in the robot coordinate system. The TCP of the sphere can, for example, be identified by a one time measurement for fixed installations, or every time the calibration is to be carried out using built in methods in the robot controller for flexible installations.

In this embodiment, a force sensor 12 for measuring forces in three orthogonal directions is provided between the tool flange 7 and the tool 8, and accordingly between the calibration object 10 and the robot 1. The robot is programmed to be moved by means of force control. This means that the movement of the robot depends on the measuring signal from the force sensor 12.

The system further comprises three second calibration objects 14, 15, 16 positioned in the working range of the robot, in this case positioned on the fixture 3 holding the work piece 2. Each of the second calibration objects 14-16 is a female calibration object comprising three non-parallel inclining surfaces arranged to receive the sphere 10 so that the sphere is in contact with all three surfaces at the same time when the sphere is in a unique and defined position relative the second calibration object. In the following, the position at which the sphere is in contact with all three surfaces at the same time is denoted a reference position.

Figures 2A, 2B, 2C:
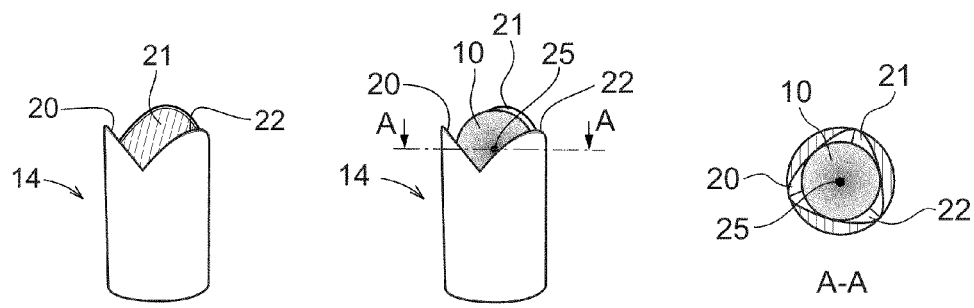
FIG. 2a shows an example of a female calibration object.
FIG. 2b shows a male calibration object in the form of a sphere received by the female calibration object shown in FIG. 2a and the sphere in the reference position.
FIG. 2c shows a cross section A-A through the sphere and the female calibration object shown in FIG. 2b.

The female calibration object 14 is shown in more detail in FIG. 2a-2c. The female calibration object comprises three non-parallel inclining surfaces 20, 21, 22. The inclinations of the surfaces are preferably in the interval of 30-60° in relation to the longitudinal axes of the tube. For example, the shape of the upper end of the second calibration object has a form of a truncated inner corner of a cube. One upper end of the female calibration object is formed as a tube having an opening for receiving the sphere and the other lower end is designed for positioning the calibration object on the fixture 3. The tube is tapering in a direction away from the opening. The upper end of the calibration object has a mainly triangular cross section. The tube has three inner surfaces 20,21,22 inclining towards each other along the longitudinal axis of the tube. Only at one position along the longitudinal axis of the tube, the cross-section is such that the distances between the surfaces correspond to the cross section of the sphere 10. Accordingly, the sphere fits exactly in the tube at one single position, in which the sphere is in contact with all three surfaces 20-22. The reference position is defined to be the centre point 25 of the sphere when the sphere is contact with all three surfaces. FIG. 2c shows the sphere and the surfaces when the sphere is located in the reference position.

The three second calibration objects 14, 15, 16 are preferably located in the local coordinate system so as to form corners of a triangle and preferably represent a single solution to the coordinate transformation. The robot controller 5 is configured to receive and store the positions of the robot when the sphere 10 is in mechanical contact with all three surfaces 20, 21, 22 of the second calibration objects 14, 15, 16 and comprises software for calculating the relation between the local coordinate system and the robot coordinate system based on the robot positions when the sphere is in contact with the surfaces of the calibration objects.

For example, the second calibration objects 14, 15, 16 can be included in the fixture as a part of the installation. The position of the sphere needs to be identified when manufacturing the fixture; a one time measurement. The reference positions of the second calibration objects are measured in the local coordinate system and saved. The reference position is defined as the centre point of the sphere when the sphere is located in the second calibration object. The reference position for a second calibration objects are determined beforehand and in relation to the local coordinate system.

The method must be automatic and accurate in finding the exact location of the sphere in the second calibration object. For a standard robot positioning this will be very difficult. In order to achieve an automatic location of the sphere, a soft and compliant control of the robot is needed. In order to achieve such a soft and compliant control of the robot it is possible to use force control including a force/torque sensor, as shown in FIG. 1. If force control is not included in the robot installation, it is possible to use a compliant server in order to move the robot into mechanical contact with the calibration object, but still be compliant to find the exact accurate position of the sphere. Once the sphere is in correct position in the calibration object, the position data can be read within the robot controller 5 and used together with the reference values for calculations of the relation between the robot coordinate system and the local coordinate system.

Figure 3:
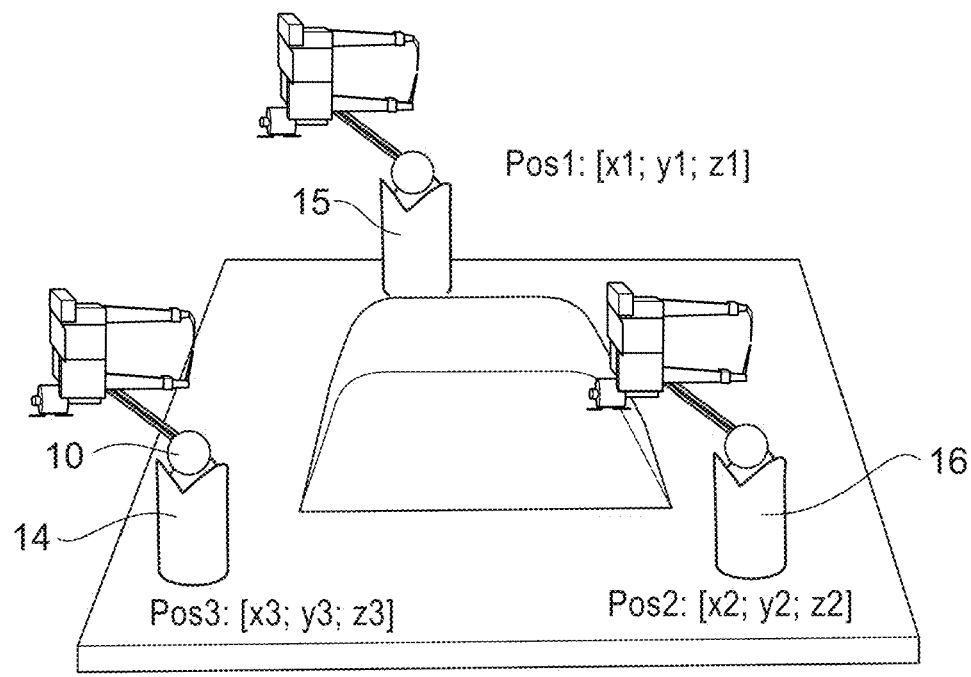
FIG. 3 illustrates the robot moving the sphere between the female calibration objects during calibration.

FIG. 3 illustrates the robot moving the sphere 10 between the female calibration objects 14-16 during calibration. When the sphere is in the reference position of the female calibration object, the position of the robot is read and stored. The reference positions Pos 1, Pos 2 and Pos 3 of the female calibration objects are determined in the local coordinate system based on initial measurements of the fixture. The coordinates for the sphere 10 in the robot coordinate system can easily be identified automatically or semi-automatically by using one of the second calibration objects on the fixture. The robot is moved, for example with soft servo, into different orientations in order to find the accurate position. The TCP is calculated with built-in mathematics in the robot software. When the TCP of the sphere is known, it is easy to determine reference positions Pos 1, 2 and 3 on the fixture in the robot coordinate system based on the measured robot positions. The positions of the reference point in the robot coordinate system can be used together with the pre-determined positions of the reference positions determined in the local coordinate system in order to identify the relation between the robot coordinate system and the local coordinate system.

Figure 4:
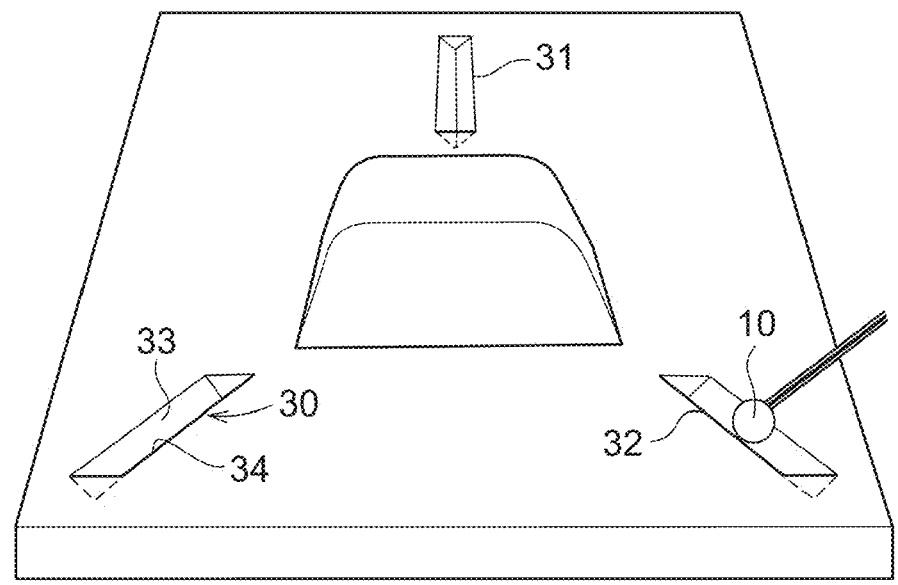
FIG. 4 shows another example of the female calibration object.

FIG. 4 shows an alternative embodiment of the present invention. In this embodiment three second calibration objects 30, 31, 32 are provided close to the working object in the robot working range. Each calibration object comprises a groove having two non-parallel inclining surfaces 33,34. In this case the single location position information is decreased to a line position information and needs to be combined in different ways to generate useful data. One possible solution is to determine a line based on the two surfaces of each groove. At least two reference positions on each groove are measured and a line between the positions is calculated. The lines between the surfaces can be used for identification of significant parts of the work piece and can easily be used for identifying the correct coordinate system of the work piece. The line based on the two surfaces is determined by two position measurements with a sphere 10. The relation between the local coordinate system and the robot coordinate determined based on the determined lines.

Figure 5:
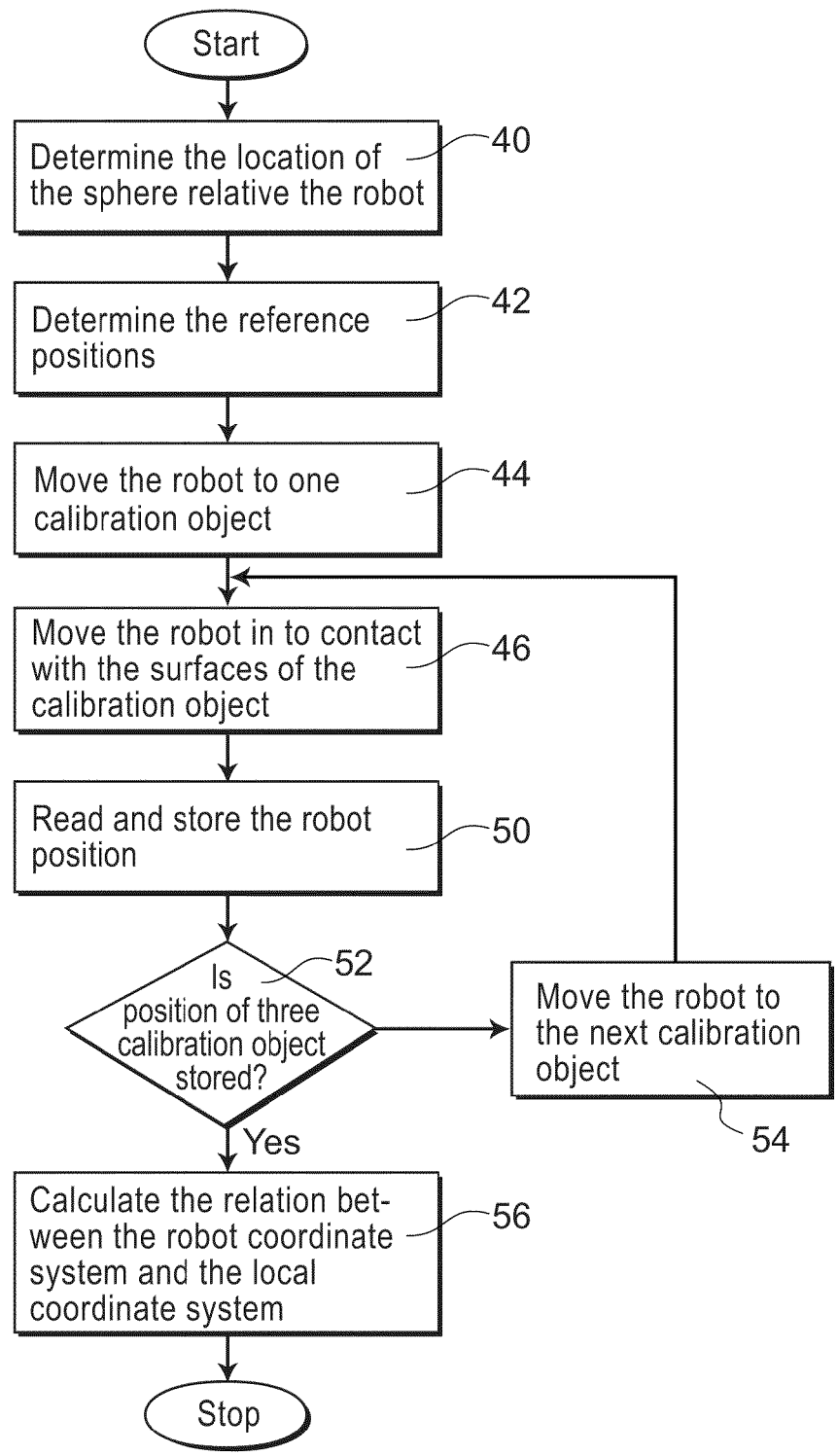
FIG. 5 shows a flow diagram illustrating an example of a method according to the invention.

FIG. 5 shows a flow chart illustration of a method according to an embodiment of the present invention. It will be understood that each block of the flow chart can be implemented by computer program instructions.

In the following example, the first calibration object carried by the robot is a sphere and the three second calibration objects located in the working range of the robot is of the type shown in FIG. 2a-c including three non-parallel, inclining surfaces. At first, the location of the sphere in relation to the robot has to be determined. This means that the tool centre point (TCP) of the sphere is determined in relation to a tool coordinate system. The tool coordinate system is known in relation to the base coordinate system of the robot. When the tool centre point of the sphere has been determined, the TCP of the sphere is known in the base coordinate system of the robot, block 40. The tool centre point is determined by any known method, for example, the method previously described with reference to FIG. 3. The reference positions of all three calibration objects have to be determined in the local coordinate system before the calibration begins, block 42. The positions are, for example, identified in the local coordinate system using a high accuracy measuring device, such as a laser tracker, touch probe or a CMM. The measuring device will identify the centre of a sphere, with exactly the same diameter as the sphere 10 received by the female calibration object, in the local coordinate system. The location of the sphere relative to the robot and the reference positions is preferably determined beforehand, i.e. before the actual calibration begins. The relation between the sphere and the robot and the measured reference positions are stored in the robot controller.

When the actual calibration begins, the robot is moved to a position close to one of the female calibration objects, block 44. Thereafter, the robot is moved so that the sphere is in contact with all calibration surfaces of the female calibration object, block 46. This can, for example, be done by first moving the robot is so that the sphere is into contact with one of the surfaces, and there after moving the robot along the surface without loosing contact with the first surface until the sphere comes into contact with the next surface. Thereafter the robot is moved along the two surfaces without loosing contact with the surfaces until the sphere comes into contact with the third surface. When the sphere is in contact with all three surfaces of the female calibration object, the robot movement is stopped and the current robot position is stored in the robot controller, block 50. The robot position is the positions of the axes of the robot. The method steps described in block 46, 48 and 50 is repeated for the other two female calibration objects. When the sphere is in contact with all three surfaces of the calibration object, the sphere is in the reference position, and the position of the robot is read and stored. When the robot position for all three reference positions have been read and stored, the robot controller calculates the relation between the robot coordinate system and the local coordinate system, block 56. At first, the reference positions are determined in the robot coordinate system based the measured robot positions and the position of the sphere in relation to the robot. Thereafter, the relation between the coordinate systems is calculated based on the reference positions determined in the robot coordinate system and the reference positions determined in the local coordinate system by means of ordinary coordinate transformations.

In this example, the robot coordinate system is the base coordinate system of the robot and the local coordinate system is the work piece coordinate system. The relation between the robot coordinate system and the local coordinate system can be used for programming the robot for performing work on the work piece.

The present invention is not limited to the embodiments disclosed but may be varied and modified within the scope of the following claims. For example, the second calibration object can be included in the work pieces. This will provide a possibility to identify each and every one of the work pieces and thereby reducing the need of high precision fixtures. In an alternative embodiment, it is possible to have more than three second calibration objects located in the working range of the robot. In an alternative embodiment, a female calibration object including at least two inclined surfaces is attached in a fixed relation to the robot, and a plurality of male calibration objects shaped as spheres is positioned in the working range of the robot. The calculation of the relation can be made in an external computer.

The invention claimed is:

1. A method for determining the relation between a local coordinate system located in the working range of an industrial robot and a robot coordinate system, wherein the method comprises:
    attaching a first calibration object in a fixed relation to the robot,
    determining the position of the first calibration object in relation to the robot,
    locating at least three second calibration objects in the working range of the robot, wherein at least one of the calibration objects is a male calibration object having a protruding part shaped as a sphere, and at least one of the calibration objects is a female calibration object comprising at least two nonparallel, inclining surfaces arranged to receive the sphere so that the sphere is in contact with the surfaces in at least one reference position, wherein the inclination of the surfaces is in the interval of 20-80°,
    determining at least one reference position for each of the second calibration objects in the local coordinate system,
    A) moving the robot in a compliant way until the sphere is in mechanical contact with said surfaces of the female calibration object,
    B) reading the position of the robot when the sphere is in mechanical contact with said surfaces,
    repeating the steps A-B for the other second calibration objects, and
    calculating the relation between the local coordinate system and the robot coordinate system based on the position of the first calibration object in relation to the robot, the reference positions of the second calibration objects in the local coordinate system, and the positions of the robot when the sphere is in mechanical contact with the surfaces of the second calibration objects.

2. The method according to claim 1, wherein at least one of the calibration objects comprises three nonparallel, inclining surfaces arranged to receive the sphere so that the sphere is in contact with all three surfaces at the reference position.

3. The method according to claim 1, wherein the sphere is attached to the robot, the other calibration objects are shaped as grooves with two inclining surfaces, and at least three grooves are located in the robot work area such that their longitudinal directions are non parallel, and the method comprises moving the robot in a compliant way until the sphere has been in mechanical contact with both surfaces on all three grooves and the positions of the robot has been stored for all three grooves, and calculating the relation between the local coordinate system and the robot coordinate system based on the positions of the robot when the sphere is in mechanical contact with the surfaces of said grooves.

4. The method according to claim 1, wherein the robot is automatically moved by means of force control.

5. The method according to claim 1, wherein the robot is automatically moved by means of a soft servo.

6. A system for determining the relation between a local coordinate system located in the working range of an industrial robot and a robot coordinate system, wherein the system comprises:
    a first calibration object to be attached in a fixed relation to the robot,
    three second calibration objects to be positioned in the working range of the robot, wherein at least one of the calibration objects is a male calibration object having a protruding part shaped as a sphere, and at least one of the calibration objects is a female calibration object comprising at least two nonparallel, inclining surfaces arranged to receive the sphere so that the sphere is in contact with the surfaces at a reference position, wherein the inclination of the surfaces is in the interval of 20-80°, means for automatically moving the robot in a compliant way until the sphere is in mechanical contact with the said surfaces of the female calibration object, and a computing unit configured to receive and store the position of the robot when the sphere is in mechanical contact with said surfaces, and to calculate the relation between the local coordinate system and the robot coordinate system based on a known relation between the first calibration object and the robot, the reference positions in the local coordinate system, and the position of the robot when the sphere is in mechanical contact with said surfaces.

7. The system according to claim 6, wherein at least one of the calibration objects comprises three nonparallel, inclining surfaces arranged to receive the sphere so that the sphere is in contact with all three surfaces at the reference position.

8. The system according to claim 7, wherein the calibration object is shaped as a truncated inner corner of a cube.

9. The system according to claim 6, wherein the sphere is attached to the robot, the other calibration object is shaped as a groove with two inclining surfaces, and at least three grooves are located in the robot work area such that their longitudinal directions are non parallel.

10. The system according to claim 6, further comprising a force sensor adapted to measure forces in at least two directions, which force sensor is located between the first calibration object and the robot, and a control unit configured to move the robot in dependence of force measurements from the force sensor.

11. The system according to claim 6, further comprising a soft servo.

12. The system according to claim 6, wherein the second calibration objects are located on a work piece to be processed by the robot or on a fixture holding the work piece.

13. The system according to claim 6, wherein the local coordinate system located in the working range of the industrial robot is a coordinate system of a fixture for holding a work piece to be processed by the robot.

14. The method according to claim 1, wherein the local coordinate system located in the working range of the industrial robot is a coordinate system of a fixture for holding a work piece to be processed by the robot.

* * * * *